March 19, 1968  E. A. LUST  3,374,018
SNAP-ACTION CATCH
Filed Jan. 6, 1966
3 Sheets-Sheet 2

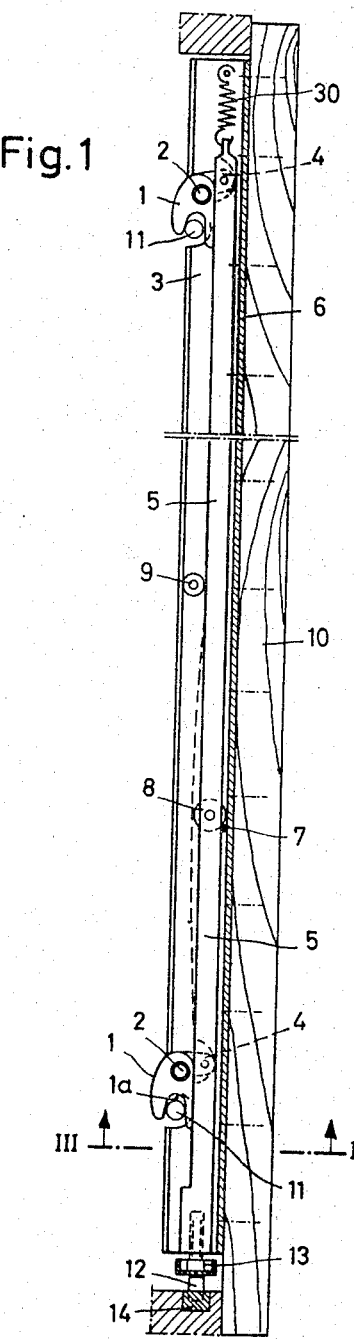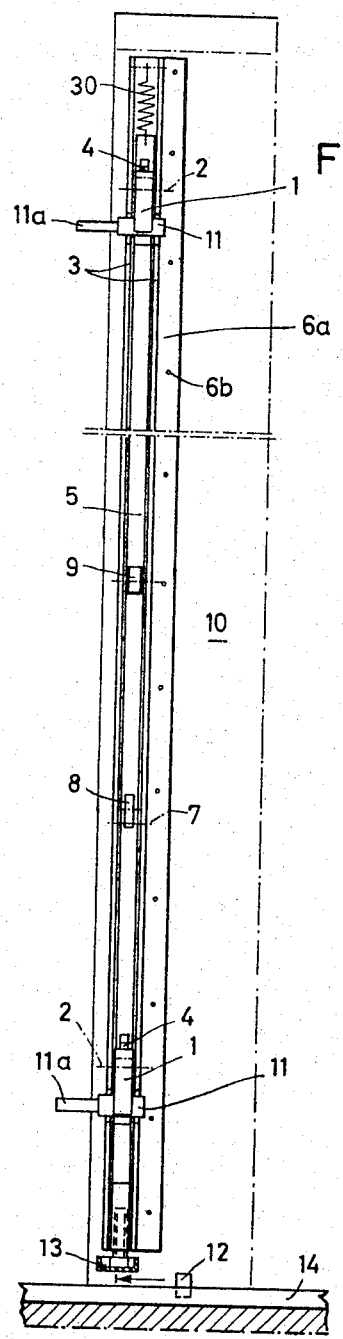

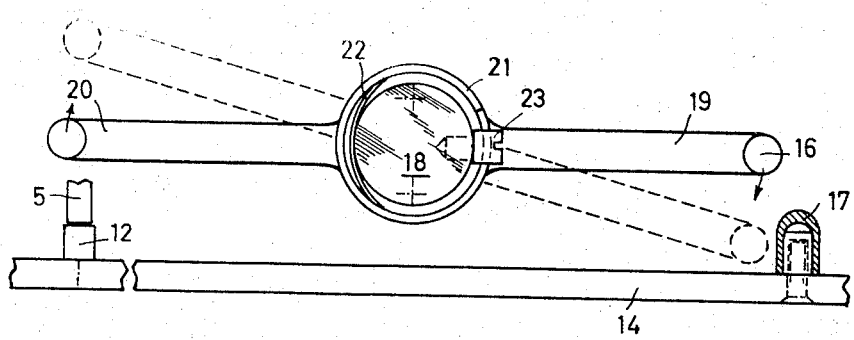
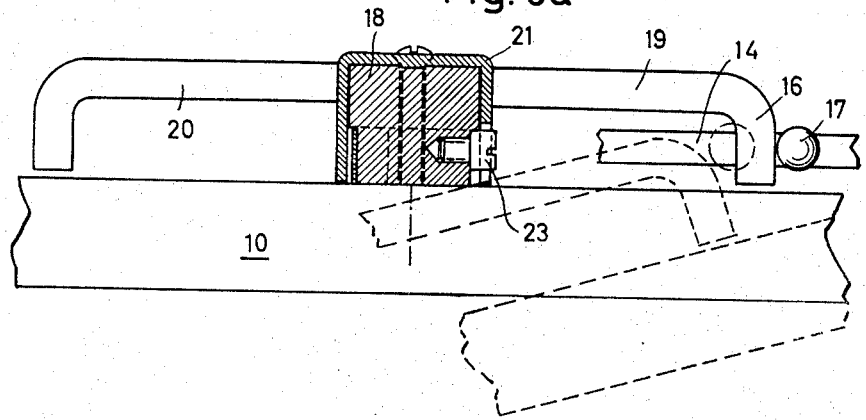
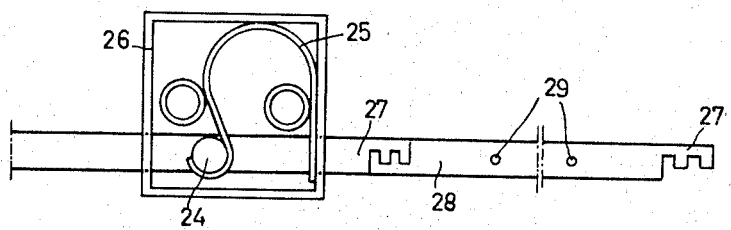

United States Patent Office 3,374,018
Patented Mar. 19, 1968

3,374,018
SNAP-ACTION CATCH
Ernst Adam Lust, Industriestrasse 13–15,
Lampertheim, Hesse, Germany
Filed Jan. 6, 1966, Ser. No. 519,113
Claims priority, application Germany, Jan. 8, 1965,
L 49,670
6 Claims. (Cl. 292—45)

ABSTRACT OF THE DISCLOSURE

A catch mechanism for latching a door member in an associated frame member. The mechanism comprises at least one forked element mounted for pivotal movement on either the door or the frame, a catch pin for each forked element mounted on the other of the two for engaging the forked element, a resilient thrust rod slidably mounted in the same member as the forked element, means connecting the forked element and the thrust rod for displacing the thrust rod as the forked element moves pivotally, a roller secured to the thrust rod and movable together with the thrust rod, a peg fixed in the path of the roller such that as the roller passes over the peg, the thrust rod being resilient is laterally deformed. The peg is positioned relative to the roller so that it is in engagement with the roller when the forked element is positioned for the door to be either opened or closed.

---

The invention relates to a snap-action catch or the like comprising: at least one forked member which is adapted to pivot between an open position and a closed position via a dead-centre position and which is preferably disposed on a door; and a catch pin which is disposed on the door frame and which co-operates with the forked member.

Catches, fasteners and latches of this kind are known in various forms. A special spring mechanism is associated with each individual forked member, the spring seeking to retain the forked member in both the closed and open positions. If the door axis is vertical, the pivots for the forked members are also disposed vertically, with the result that a relatively large horizontal space is required to pivot the forked members.

It is an object of the invention to provide a catch of the kind specified which is of much simpler construction than the known devices, the forked members of which are of very reduced horizontal extent and which can easily be locked against pivoting from the closed position into the open position. Another object of the invention, in association with cupboards comprising a number of doors, is to enable the forked members of the various cupboard doors to be locked in the closed position by a device common to all the cupboard doors. According to the invention, therefore, each forked member has a projection by means of which the forked member is articulated to a thrust rod which is common to all the forked members and extends perpendicularly to the pivots of the forked members, the thrust rod being movable lengthwise, after a movement-inhibiting force has been overcome, from one end position in which the forked members are in the closed position, to another end position in which the forked members are in the open position and vice versa.

The catch according to the invention is of very simple construction and therefore cheap to manufacture, can be assembled readily and is not easily upset. If the thrust rod is disposed parallel to the vertical axis of door pivoting, the various forked members also extend vertically and therefore take up little horizontal space.

The catch according to the invention does not need special spring snap mechanisms for the various forked members. Instead, according to the invention, the resilience of the thrust rod serves to produce the force inhibiting thrust rod movement.

Preferably, a stressing roller is mounted, with its axis perpendicular to that of the thrust rod, on one long side thereof between two lateral guides for the thrust rod on the opposite long side, and the stressing roller engages one side of a peg when in a first end position and the other side of the peg when in a second end postion, and when the thrust rod moves, the stressing roller rolls over the peg and bends the thrust rod out laterally. In this event, the thrust rod is bent out laterally whenever it moves from one end position to the other, but the thrust rod offers to the bending-out a resistance corresponding to its own resilience, such resistance serving to retain the forked members in the open or closed position.

Advantageously, the thrust rod and the forked members are mounted in a U-section rod or bar, the pivots of the forked members being mounted on the arms of the U-section rod while the thrust rod extends between the web of the U-section and a straight line determined by the pivots of the forked members. The U-section rod guides and protects the moving parts of the catch. Conveniently, the peg is disposed on the web of the U-section rod, and one of the two lateral guides disposed on that long side of the thrust rod which is remote from the peg is formed by a forked member, the other such guide being formed by a guide roller mounted between the arms of the U-section rod. The distance of the particular forked member concerned from the guide roller determines the magnitude of the force which inhibits thrust rod movement.

The projections via which the forked members are articulated to the thrust rod describe an arc during pivoting. At the top of the arc the thrust rod is deflected towards the web of the U-section rod. The resistance which the thrust rod offers to this bending-out movement is cumulative with the resistance associated with the stressing roller and peg system; alternatively, given appropriate size and design the resistance associated with deflection of the thrust rod towards the U-section web can suffice as the only resistance which the thrust rod opposes to its movement.

The distances from the guide roller to the peg and to the U-section rod web can be varied.

According to another feature of the invention, the thrust rod is moved against spring biasing only into the open position. This feature increases the force required to open the door. When the door is closed the spring becomes relaxed so that its force reduces the force required to close the door. One great advantage of the catch according to the invention is that locking the thrust rod against movement prevents all the forked members articulated to the thrust rod from pivoting. Consequently, a simple way of locking the forked members of a door in the closed position is to push a bolt or the like into a recess provided in the thrust rod. As an advantageous alternative, however, a locking abutment can be moved into the space into which one end of the thrust rod has moved when in its closed position. When this feature is used for cupboards comprising a number of doors, the locking abutments for the thrust rods of the various door catches are mounted on a common central bar which can move lengthwise and which can be locked in the closed position. In the most usual case—i.e., the case in which the pivot pins of the cupboard doors are disposed vertically—the central bar on which the catches are mounted extends along the top and/or bottom horizontal edge of the door frame. If required, however, the catch according to the invention can be disposed on the top and/or bottom horizontal edge of the or each door frame, in which event all the doors can be opened and closed by a single or by two thrust rods and by the forked members articulated thereto.

Conveniently, in cases in which the various door catches are disposed vertically and a horizontally central bar is provided on which the catches are mounted, the central bar can be moved into, against spring biasing, and secured in, only that position in which the locking abutments disposed on the central bar are in the paths of the various thrust rods. When the central bar is released, the spring moves it into the position in which the various locking abutments are not in the path of the thrust rods. Conveniently, in this case, the central bar has mounted on it a main abutment which co-operates with a matching element on one door and via which the central bar can be moved into the locking position when the particular door concerned is closed. Consequently, when the door which has the matching element for the abutment on the central bar is closed, all the other doors are locked automatically. Consequently, a key-operated lock or the like is required only for the door which has the matching element. In order that the latter door may be opened, no locking abutment must be movable into the path of the thrust rod of such door.

The matching element whose closure locks all the other doors can be moved into and out of the position in which it co-operates with the main abutment on the central bar upon closure of the door. Consequently, when the particular door concerned is closed, all the other doors can either be locked or merely closed by their catches, exactly as required.

Conveniently, the central bar is combined from various bar portions corresponding in length to one cupboard compartment. The ends of the bar portions can engage one another by a hook or tooth action.

Advantageously, the locking abutments for the various thrust rods can be removed from the central bar. The various cupboard doors can then be opened or closed independently of the other cupboard doors. According to another feature of the invention, the catch pins have at least at one end, a mounting projection and the same is eccentric of that part of the catch pin which co-operates with the forked member. The closure pin can then be set to the best position for the catch just by being turned in the bore in which it is mounted.

Advantageously, the forked members, the stressing rollers, the pegs associated therewith, the locking abutments and the main abutments and its matching element are made of polyamide or some other plastic material, to enable the doors to open and close very quietly.

Other advantages and features of the invention will be disclosed by the description of an embodiment, reference being made to the drawings wherein:

FIGS. 1 and 2 are two views at right-angles to one another;

Figure 3:
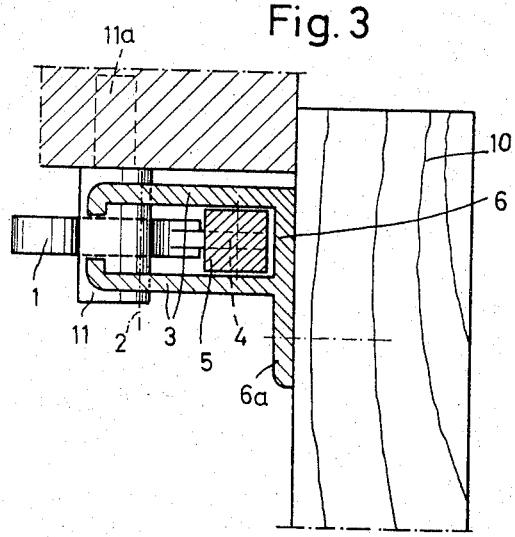
FIG. 3 is a section on the line III—III of FIGS. 1 and 2, in the closed position.
Figure 4:
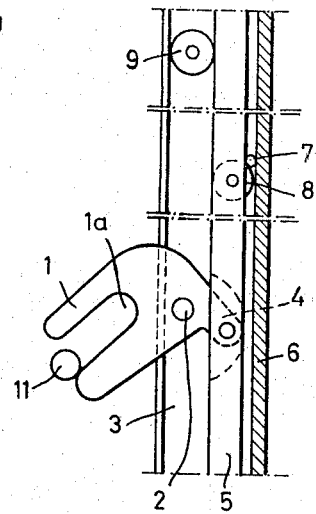
Figure 5:
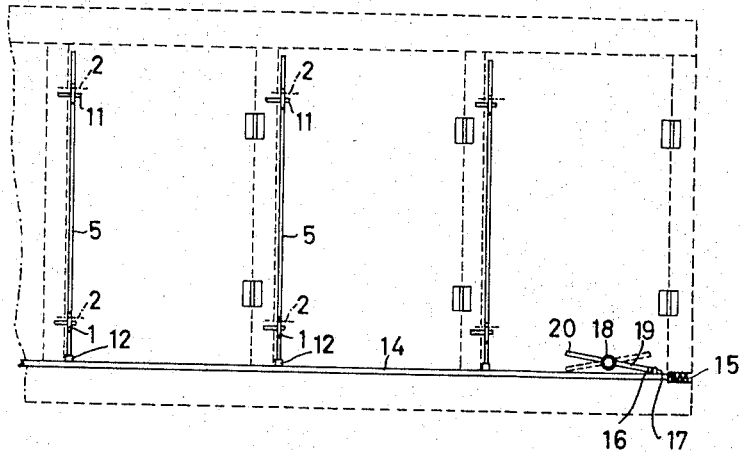

FIG. 4 diagrammatically shows the main items of the catch in the open position;

FIG. 5 diagrammatically shows how the doors of a cupboard comprising a number of doors are closed by operation of the catches according to the invention, all the catches being lockable in the closed position by a single central bar;

FIGS. 6 and 6a are views on an enlarged scale showing the system for shifting the central catch-mounting door upon closure of the last cupboard door to be closed, and FIG. 7 shows an embodiment of a spring element which tends to move the central bar into the open position.

Forked members 1 are pivotally mounted by means of pivots 2 between arms 3 of a U-section rod. Each member 1 has a lever-like projection 4 which is articulated to a thrust rod 5 common to all the forked members 1 associated with one cupboard door, the projection 4 being movable along web 6 of the U-section rod. A peg 7 is secured to the web 6 and a stressing roller 8 is disposed on the thrust rod 5. The axis of the roller 8 and the axis of the peg 7 are at right-angles to the longitudinal axis of the thrust rod. When the forked members 1 are in the closed position, corresponding to their hook mouth 1a extending substantially parallel to the thrust rod 5, the stressing roller 8 is in engagement with and above the peg 7. When the members 1 are in the open position, however, the roller 8 is in contact with and below the peg 7. The thrust rod 5 is guided above the stressing roller 8 and at some distance therefrom by a guide roller 9 also mounted between the U-rod arms 3; below the stressing roller 8 the thrust rod 5 is guided by, and located transversely of its length by, a forked member 1. When the roller 8 rolls over the peg 7 as the thrust rod 5 moves from the open position to the closed position or vice versa, the thrust rod 5 is therefore bent out laterally. Accordingly the resilience of the thrust rod and the distance between the guide roller and the corresponding forked member 1 determines the resistance to opening and closing of the forked members 1. In this particular embodiment, the forked members 1 are disposed on the door 10 along the edge parallel to the axis of rotation, and the pins 11 are disposed on the door frame. However, the converse arrangement is possible; similarly, the thrust rod with the forked members can be secured horizontally to the door frame.

Connected to the top end of the thrust rod 5 is a tension spring 30 which is also mounted between the U-rod arms 3. The spring 30 is stressed when the rod 5 moves from the closed position to the open position. The energy required to stress the spring 30 forms an extra resistance to be overcome when the forked members 1 are pivoted from the closed position into the open position, but closure is assisted by the pull of the spring 30.

Disposed below the thrust rod 5 is a looking abutment 12 adapted to be moved beneath the lower end of the thrust rod when the thrust rod is in the open position. When the door is in the closed position and the abutment 12 is disposed directly below the lower end of the thrust rod—i.e., below an adjusting screw 13 screwed into the thrust rod 5—the catch is locked shut. A plastic covering is placed around the head of the screw 13. The catch pins 11 have on one side an eccentric mounting pin 11a for mounting them in appropriate mounting bores in the door frame. The pins 11 can be set to the correct position by being rotated in such bores.

The U-rod web 6 has on one side a flange-like widened part 6a which is formed with bores 6b through which the shanks of fixing screws can extend.

In the multiple-door cupboard diagrammatically shown in FIG. 5, the catches for all the cupboard doors can be locked closed by a common central bar 14. Disposed on the bar 14 are the locking abutments 12 for all the thrust rods 5, so that the bar 14 can be moved to lock or release all the thrust rods 5. Disposed at the end of the bar 14 is a spring mechanism 15 tending to move the bar 14 to the left into the position in which the abutments 12 are adjacent the thrust rods 5, so that the same can move downwards and the forked members 1 can pivot outwards and upwards. Also disposed on the bar 14 is a main abutment 17 cooperating with a matching element 16 disposed on the last cupboard door to be closed. When such door closes, the element 16 slides along the main abutment 17 and moves the same to the right, so that all the locking abutments 12 move below the associated thrust rods 5 and the spring 15 is stressed. The element 16 takes the form of a stirrup-like lever pivotable around a pin 18 and can be pivoted therearound from a position in which the element 16 cooperates with the main abutment 17 at closure of the door.

As FIGS. 6 and 6a show in greater detail, the matching element 16 takes the form of one end of an arm 19 of a double-armed lever 19, 20 whose two arms are welded to a bush or collar or the like 21 pivotable around the pin 18.

That end of the pin 18 which contacts the door is turned to a reduced diameter, and the annular space left receives a spring strip 22 which bears at both ends against the inner wall of the bush 21 while its central portion contacts the pin 18. Considerable frictional resistance is therefore opposed to the pivoting of the collar 21 and therefore of the lever 19, 20 so that the same, as it were, locks itself in whichever position it happens to be. The lever arm 19 comprising the matching element 16 can be pivoted into the desired position, for instance, by foot operation, by means of the lever arm 20. Pivoting is limited by a stop screw 23 which is screwed into the pin 18 and which co-operates with the axial edges bounding a slot in the bush 21.

The spring element 15 for shifting the bar 14 to the open position can be disposed anywhere thereon and, with advantage, can take the form shown in FIG. 7, where the central bar 14 comprises a thrust pin 24 which extends perpendicularly to bar length and which forms one abutment of a stirrup-like spring strip 25, the other end thereof bearing against the door frame. The two spring strip ends which bear the one against the pin 24 and the other against the door frame are opposite to one another in the direction of the bar 14 so that the spring 25 tends to shift the bar 14. The spring 25 is disposed in a casing 26.

The bar 14 is combined from individual portions each corresponding to the length of one cupboard compartment. To enable the various portions to be interconnected, the ends 27, 28 of the portions resemble toothed racks, the tooths of one end engaging alternately in the tooth spaces of the other end. The looking abutments 12 are received in bores 29 which are pierced previously in the various bar sections. The toothed rack systems at the bar section ends 28, 27 are all of identical construction but are cut in respective facing ends of the bar portions.

I claim:
1. A catch mechanism for latching a door member in a frame member in a closed position of the door member while allowing opening of the door member, said catch mechanism comprising at least one forked element mounted on one of said members for pivotal movement between first and second positions, a catch pin mounted on the other of the members for engaging the forked element to move the same between said first and second positions, a thrust rod slidably mounted in said one member, means connecting the forked element and the thrust rod for displacing the latter as the forked element undergoes pivotal movement, a roller secured to said thrust rod and movable therewith, a peg fixed in the path of movement of the roller, said thrust rod being resilient so that as the roller passes over the peg the thrust rod is laterally deformed elastically, and locking means between said members including an element coupled to said thrust rod for activating the locking means in one of said positions of the forked member, said peg being positioned relative to the roller to be in engagement therewith in both positions of the forked element to resist pivotal movement thereof between said positions and thereby resist opening and closing of the door member.

2. A mechanism as claimed in claim 1 comprising a U-shaped guide member secured to said one element, said guide member including a web and arms, a pivot connecting each forked member to the arms of the guide member, said thrust rod being slidably mounted in said guide member between said pivot and the web, said peg being secured on the web of the guide member, and a guide roller mounted on the arms of the guide member at a longitudinal spacing from the peg for the guidable passage of the thrust rod.

3. A mechanism as claimed in claim 2, wherein the distances from the guide roller to the peg and to the web of the guide member are variable.

4. A mechanism as claimed in claim 1, wherein said locking means comprises a locking abutment positionable into the space into which one of the ends of the thrust rod has moved in the closed position.

5. A mechanism as claimed in claim 4 comprising a number of door elements and a common central bar for the locking abutments for each of the trust rods of the respective door elements, said central bar being movable lengthwise and adapted for being locked in a closed position for the door elements.

6. A mechanism as claimed in claim 5, wherein one of the abutments on the central bar is a main abutment, the mechanism further comprising a matching element on one of the doors engaging the said one abutment for moving the central bar into a locking position when the associated door is closed.

References Cited

UNITED STATES PATENTS

| | | |
|---|---|---|
| 564,401 | 7/1896 | Wernicke. |
| 681,155 | 8/1901 | Tobey. |
| 998,642 | 7/1911 | Shean _____ 292—25 X |
| 1,180,619 | 4/1916 | Strelcsike. |
| 1,700,557 | 1/1929 | Cheriack et al. _____ 292—50 |
| 3,291,514 | 12/1966 | Isaksson _____ 292—30 X |

MARVIN A. CHAMPION, *Primary Examiner.*

JOHN R. MOSS, *Assistant Examiner.*